United States Patent Office 3,013,036
Patented Dec. 12, 1961

3,013,036
PROCESS OF PREPARING N-ACYL TAURINES
Frederic R. Huber, Ramsey, and Leslie M. Schenck, Mountainside, N.J., assignors to General Aniline & Film Corporation, New York, N.Y., a corporation of Delaware
No Drawing. Filed Dec. 1, 1959, Ser. No. 856,372
6 Claims. (Cl. 260—401)

The present invention relates to an improved process of preparing surface active agents by the reaction of an amino alkane sulfonic acid with a fatty acid chloride.

The reaction of a fatty acid chloride with 2-amino alkane sulfonic acid and the alkali metal salts thereof to yield anionic surface active agents is well known. In U.S. Patent 1,932,180 there are described several procedures for the preparation of such surface active agents. In actual commercial production, however, the procedure described by Kastens and Ayo, Ind. and Eng. Chem., vol. 42, pages 1630–1631, 1950, is employed which involved the Schotten-Baumann reaction. Minor changes in procedure yield products of various concentrations and physical states.

During the commercial procedure, appreciable hydrolysis of the acyl chloride occurs, resulting in the formation of soap as a by-product. The presence of soaps admixed with acyl taurides interferes with their lathering properties, and it is desirable, therefore, to keep the hydrolysis at a minimum. In the conventional batch process, the tendency for hydrolysis of the acyl chloride can be minimized by operating with large excesses of methyl taurine, a costly approach to low soap content in the final product, or by conducting the reaction at low temperatures. However, since the slurries of acyltaurides found in commercial manufacture are quite viscous at low temperatures, adequate agitation in the batch process becomes a significant problem, especially toward the end of the reaction, and lack of physical contact between the acyl chloride and the appropriate taurine promotes hydrolysis rather than tauride formation.

From the foregoing discussion of the prior art and the commercial process, it is clearly manifest that an improved process of reacting acyl chlorides with 2-aminoalkane sulfonic acids in the form of their alkali metal salts which will give high yields of the N-acyl taurine is highly desirable. Accordingly, it is the principal object of the present invention to provide such a process.

Other objects and advantages will be more clearly evident from the following discussion.

We have discovered that when acyl chlorides are reacted with aqueous solutions of alkali metal salts of 2-amino alkane sulfonic acid in the absence of alkali metal hydroxides, while employing the taurate-hydrochloride buffer system as the halogen acid acceptor, increased yields of N-acyl taurines are obtained. In other words, we have found htat the maintenance of an inorganic alkali in the presence of aqueous taurines and taurides during the addition of an acyl chloride does not hinder the hydrolysis of the acyl chloride, but actually promotes the formation of alkali metal soaps. This can be readily understood by referring to the chemical reaction for the formation of an Igepon as given by Kastens and Ayo, loc. cit.

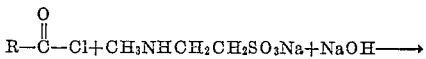

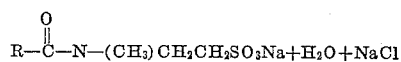

By inspection, it is apparent the formation of sodium soap is a competing reaction with the desired Igepon formation:

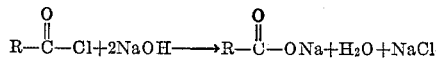

During the course of our experiments with the process of the present invention, we have found, rather surprisingly and unexpectedly, that an acyl tauride slurry of improved yield and purity can be readily prepared by a method which precludes the possibility of inorganic alkali existing in the reaction mixture during the acyl chloride addition. In our process, we take advantage of the taurine moiety itself as a halogen acid acceptor to promote the condensation of an acyl chloride and a taurine to an acyltauride without the presence of an inorganic alkali acid acceptor. In effect, the condensation reaction takes place in a solution or slurry containing only the principal reactants, acyl chloride and taurine, together with an alkali metal chloride and water.

In the practice of our invention, one-half mole of an acyl chloride, i.e., a monocarboxylic acid of from 6 to 22 acrbon atoms, in the form of its acid chloride, is gradually added to an aqueous solution containing one mole of an alkali metal salt of a 2-amino-alkane sulfonic acid. When this addition is completed, the pH of the resultant system is about 7, and the reaction that has taken place can be represented as follows, using sodium methyl taurate as an example of the taurine employed:

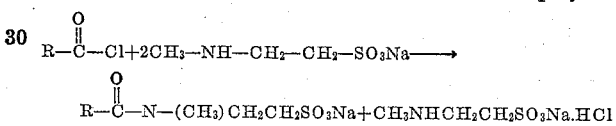

The sodium-N-methyl taurate hydrochloride is then neutralized by the addition of an equimolar quantity of an alkali metal hydroxide, such as sodium or potassium hydroxide, thereby liberating the taurine for reaction with a further amount of acyl chloride:

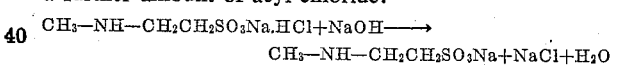

Following the caustic addition, the reaction mixture is agitated at least ten minutes before resuming acyl chloride addition to insure neutralization of the taurine hydrochloride thereby minimizing the possibility of any free alkali metal hydroxide in the system. Alternate incremental molar additions of acyl chloride and alkali metal hydroxide are continued until the weight of taurine remaining unconverted to the acyltauride is of a relatively small magnitude, normally one percent or less. The acyl chloride and alkali additions may be made over a temperature range of 10° C. to 90° C., however, we prefer an operating range of 15° C. to 40° C. for the most economical operation of our process.

In accordance with the process of our invention, the pH range of the reaction mixture will vary at different stages of the processing from about 6.8 to 10.6. This is the pH range in which sodium methyltaurate-sodium methyltaurate hydrochloride equilibrium considerations permit the existence of appreciable amounts of both species which constitutes a useful buffering range for the system.

The operation in the absence of an alkali metal hydroxide provides a more economical method of producing acyl taurides since the reactants are promoted to the desired product, and undesirable side reactions are substantially reduced. The resultant product is therefore not only formed in higher yield, but also in an improved state of purity.

As examples of monocarboxylic acids which are employed in the form of acid chlorides with an alkali metal salt of a taurine or substituted taurine any monocarboxylic acid chloride of at least 6 carbon atoms and not more than 22 carbon atoms may be employed. It is to be noted at the outset that the nature or character of the acid chloride is immaterial so long as it contains a minimum of 6 carbon atoms and not more than 22 carbon atoms. The acid chloride may be derived from a saturated or unsaturated aliphatic, alicyclic or aliphatic aromatic acid. Acids of this type include caproic acid, isocaproic acid, enanthic acid, δ-methylhexylic acid, caprylic acid, e-methylheptylic acid, dipropylacetic acid, pelargonic acid, ζ-methyloctylic acid, capric acid, η-methylnonylic acid, isoamylisopropylacetic acid, undecylic acid, θ-methyldecylic acid, di-tert.-butylmethylacetic acid, lauric acid, diisoamylacetic acid, tridecylic acid, myristic acid, pentadecylic acid, palmitic acid, di-n-heptylacetic acid, margaric acid, stearic acid, di-n-octylacetic acid, nondecylic acid, arachidic acid, behinic acid, γ-hexenoic acid, β-hexenoic acid, pyroterebic acid (4-methyl-β-pentenoic acid), α-ethylcrotonic acid, α-ethylcrotonic acid, teracrylic acid, d-citronellic acid, ι-undecylenic acid, oleic acid, elaidic acid, erucic acid, brassidi aid, sorbic acid, stearolic acid, linolic acid, behenolic acid.

In addition to these acids, acids obtained from tall oil, hydrogenated tall oil, hydrogenated tallow, naphthenic, abietic and the like may be employed in the form of their acid chlorides. Alkyl benzoic acids, such as dodecyl benzoic acid, nonyl benzoic acid, octyl benzoic acid, alkyl naphthoic acids such as nonyl naphthoic acids and the like may be used in the form of their acid chlorides. Acid mixtures from various natural plant and animal oils, such as olive, tallow, castor, peanut, coconut, soybean, cottonseed, linseed, palm, corn, and the like may also be employed in the form of their acid chlorides.

The 2-amino-alkane sulfonic acid salts that are condensed with the foregoing monocarboxylic acid chlorides are characterized by the following general formula:

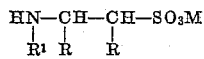

wherein R represents either hydrogen, methyl or ethyl groups, and R¹ represents either hydrogen or a hydrocarbon radical having from 1 to 20 carbon atoms, e.g. methyl, ethyl, propyl, butyl, amyl, hexyl, cyclohexyl, phenyl, heptyl, octyl, dodecyl, oleyl, linoleyl, stearyl, abietinyl, etc., and M represents an alkali metal, e.g. sodium or potassium.

As examples of 2-amino-alkane sulfonic acids that are reacted in the form of their alkali metal salts with the above monocarboxylic acid chlorides to form anionic surface active agents, the following are illustrative:

*2-amino-alkane sulfonic acids*

| | |
|---|---|
| Taurine | N-isobutyl taurine |
| Ditaurine | N-tert.-butyl taurine |
| N-methyl taurine | N-amyl taurine |
| N-methyl ditaurine | N-hexyl taurine |
| N-ethyl taurine | N-cyclohexyl taurine |
| N-propyl taurine | N-phenyl taurine |
| N-isopropyl taurine | N-heptyl taurine |
| N-butyl taurine | N-octyl taurine |

The following examples will illustrate the nature of the improved process and the results obtained therefrom:

*Example I*

A. A solution of 98.1 grams of methyl taurine (0.706 mole) as a 32.5% aqueous solution of the sodium salt is diluted with 99 grams of water and cooled to 22° C. There is then added dropwise with agitation over two hours at 22–25° C. 112 grams of 91% oleic acid chloride (0.34 mole), during which addition the pH of the reaction mixture decreased from 10.65 to 7.00. The methyl taurine hydrochloride formed during the reaction and any methyltaurine salts formed from acidic impurities in the acid chloride are neutralized by the addition of 17.2 grams (0.43 mole) of sodium hydroxide as a 30% aqueous solution. The mixture is agitated about fifteen minutes to insure adequate mixing for complete neutralization as indicated by the pH remaining constant at 10.4. The addition of 56 grams of 91% oleic acid chloride (0.17 mole) is then continued dropwise over 1 hour at 22–25° C., the pH dropping from 10.4 to 7.0. The resultant methyltaurine salt is again neutralized by the addition of 8.6 grams (0.21 mole) of sodium hydroxide as a 30% aqueous solution. When the pH remains constant at 10.0, there is added over ½ hour at 22–25° C. 28 grams of 91% oleic acid chloride (0.085 mole), the pH dropping from 10.0 to 7.3. An additional 4.3 grams (0.11 mole) of sodium hydroxide as a 30% aqueous solution is added to increase the pH from 7.3 to 9.75, thereby releasing additional methyltaurine from its hydrochloride for further reaction with an addition of 14 grams of 91% oleic acid chloride (0.042 mole) at 22–25° C. over a period of fifteen minutes. This addition again reduces the pH from 9.75 to 7.0. Additional methyltaurine is released from the salt by adding 2.1 grams (0.05 mole) of sodium hydroxide as a 30% aqueous solution, the pH increasing from 7.0 to 10.8. 7 grams of 91% oleic acid chloride (0.021 mole) is added at 22–25° C. over ten minutes, the pH dropping from 10.8 to 7.0. A final addition of 2.0 grams (0.05 mole) of sodium hydroxide is made to liberate further methyl taurine from its salt, increasing the pH from 7 to 10.25, and a final addition of 8 grams of 91% oleic acid chloride (0.027 mole) is made to complete the reaction. Upon analysis, there was found to be 282 grams of sodium oleoylmethyl tauride, a yield of 97.5% based on the oleic acid chloride charged, and 8.26 grams of sodium soap calculated as sodium oleate.

B. The following control based on the commercial Igepon process described by Kastens and Ayo, loc. cit., was performed employing the same source of raw materials.

A solution of 98.1 grams of methyltaurine (0.67 mole) as a 32.5% aqueous solution of the sodium salt is diluted with 99 grams of water and 16 grams of sodium hydroxide (0.4 mole) as a 30% aqueous solution. Maintaining the reaction mixture at 22–25° C., there was added simultaneously during a period of four hours, 225 grams of 91% oleic acid chloride (0.68 mole) and 25.7 grams (.64 mole) of sodium hydroxide as a 30% aqueous solution. A slight stoichiometric excess of sodium hydroxide was maintained in the reaction mixture at all times as determined by spot tests on triazene paper (pH 12.2–pH 13.0). At the completion of the reaction, there was obtained upon analysis 265 grams of sodium oleoylmethyl tauride, a yield of 91.8% based on the oleic acid chloride charged, and 17.96 grams of sodium soap calculated as sodium oleate.

*Example II*

A. Operating in the manner described in Example IA, 92.5 grams of 93% tallow acid chloride (0.296 mole) was added dropwise at 25–30° C. to a solution of 86 grams of methyl taurine (0.62 mole) as a 33.8% aqueous solution of the sodium salt diluted with 361 grams of water. The pH of the reaction mixture dropped from 10.94 to 6.95 during the addition. The methyl taurine hydrochloride formed was liberated by adjusting the pH to 10.5 through addition of 30% aqueous potassium hydroxide, and an additional 46 grams of 93% tallow acid chloride (.147 mole) added dropwise, with a decrease in pH from 10.5 to 7.14. Aqueous 30% potassium hydroxide was added to liberate methyl taurine from the hydrochloride, and acid chloride addition again made over a pH range of 10.1 to 7.00. Alternate additions of potassium hydroxide and tallow acid chloride were made in a similar manner until a total of 185 grams of 93% tallow acid chloride (0.593 mole) were added to complete the reaction. The product upon analysis contained 240 grams of tallow acid methyl tauride, 94.3% of theory based on the fatty acid chloride used, 4.94% free tallow acid and 1.37% methyl taurine on the 100% product basis.

B. As a control, 185 grams of 93% tallow acid chloride (0.593 mole) was reacted with 86 grams of methyl taurine (0.62 mole) as a 33.8% solution of the sodium salt diluted with 361 grams of water with simultaneous addition of 50.4 grams (0.9 mole) of potassium hydroxide as a 30% aqueous solution as described in Example IB, the pH maintained at 12-13 during the addition, to yield 92.4% of the theoretical tallow acid methyl tauride containing 8.43% free tallow acid and 2.97% methyl taurine on the 100% product basis.

*Example III*

A. Operating in the manner described in Example IA, 71 grams of 93% commercial palmitic acid chloride (0.24 mole) is added over 2 hours at 39–41° C. to an agitated mixture comprising 111.3 grams of N-cyclohexyltaurine (0.538 mole) as a 24.8% aqueous solution of the sodium salt diluted with 112 grams of water. During this addition, the pH was reduced from 10.5 to 6.9. Sufficient sodium hydroxide as a 50% aqueous solution was added to neutralize the N-cyclohexyltaurate hydrochloride formed during the initial palmitic acid chloride addition, and alternate acyl chloride and caustic additions continued within the range of pH 10.5 to pH 7.0 until a total of 142 grams of 93% palmitic acid chloride (0.48 mole) was added to the reaction mixture. Upon analysis, there was obtained 189 grams of sodium palmitic N-cyclohexyl taurate, 84% of the theoretical yield based on the acyl chloride used.

B. Operating in the conventional manner for the preparation of Igepons, 142 grams of 93% palmitic acid chloride (0.481 mole) and 26 grams of sodium hydroxide (0.65 mole) as a 30% aqueous solution were simultaneously added over four hours to an agitated solution of 111.3 grams of cyclohexyltaurine (0.538 mole) as a 24.8% aqueous solution of its sodium salt diluted with 112 grams of water. The reaction mixture was maintained at 39–41° C., and the caustic addition regulated to maintain a pH of 10.5–11.5 throughout the acid chloride addition. There was obtained 172 grams of sodium palmitic cyclohexyltaurate, 76.4% of theory based on palmitic acid chloride.

Repeating the operation with the caustic addition regulated to maintain a pH of 8.9–9.4, a 74.7% yield of sodium palmitic cyclohexyltaurate was obtained, and with the caustic regulated to maintain a pH of 9.9–10.15, a 74.3% yield of the desired product was obtained. At a pH regulated at 7.8–8.0 by simultaneous caustic addition, a yield of 47.4% of the theoretical quantity of sodium palmitic cyclohexyltaurate was formed.

*Example IV*

A. Operating as in Example IA to eliminate the presence of inorganic alkali during the acyl chloride addition, 150 grams of 95% coconut fatty acid chloride (0.596 mole) was reacted within the temperature range of 20–30° C. and the pH range of 10.4–6.9 with a solution of 85.8 grams (0.616 mole) of methyl taurine as the sodium salt dissolved in 434 grams of water. Upon analysis, the slurry contained 96.2% of the theoretical amount of sodium coconut fatty acid methyl taurate based on the mole fraction of acyl chloride used.

B. Operating in the conventional method for preparation of Igepons as given in Example IB, a control run was made in which 150 grams of 95% coconut fatty acid chloride was reacted with 85.8 grams (0.616 mole) of methyl taurine as the sodium salt dissolved in 434 grams of water at 20–30° C. and a pH range of 10.5–11.0, maintained by simultaneous addition of 30.0 grams (0.757 mole) of sodium hydroxide as a 30% aqueous solution. Upon analysis, the slurry was found to contain 202 grams of sodium coconut fatty acid taurate, 93% of the theoretical based on coconut fatty acid chloride.

*Example V*

A. Operating as in Example IA to utilize the buffering action of sodium taurate-sodium taurate hydrochloride instead of an alkali metal hydroxide as halogen acid acceptor, 150 grams of 95% coconut fatty acid chloride (0.596 mole) was reacted at 50° C. and over the pH range of 6.9–10.6 with 77 grams (0.616 mole) of taurine as the sodium salt dissolved in 434 grams of water. The resultant slurry of sodium coco fatty acid taurate was obtained in 92.8% of the theoretical yield.

B. Operating in the conventional method for the preparation of Igepons as given in Example IB, a control was run in which 150 grams of 95% coconut fatty acid chloride (0.596 mole) and 30.3 grams (0.757 mole) of sodium hydroxide as a 30% aqueous solution were added simultaneously to an agitated solution maintained at 50° C. and alkaline to triazene paper of 77 grams (0.616 mole) of taurine as the sodium salt dissolved in 434 grams of water. The resultant slurry of sodium coco fatty acid taurate was synthesized in 74.3% of the theoretical yield.

*Example VI*

A. Operating as in Example IA to utilize the buffering action of potassium N-butyl taurate-potassium N-butyl taurate hydrochloride instead of an alkali metal hydroxide as a halogen acid acceptor, 150 grams of 95% coconut fatty acid chloride (0.596 mole) was reacted at 15–18° C. and within a pH range of 6.8–10.7 with 112 grams (0.616 mole) of N-butyl taurine as the potassium salt dissolved in 425 grams of water. There was formed potassium coco acid N-butyl taurate as a slurry in 97.9% of the theoretical yield.

B. Operating a control in the conventional method for the preparation of Igepons as given in Example IB, 150 grams of 95% coconut fatty acid chloride (0.596 mole) and 30.0 grams (0.757 mole) of sodium hydroxide as a 30% aqueous solution were simultaneously added to an agitated solution maintained at 15–18° C. and at a pH of 11.0–11.5 of 112 grams (0.616 mole) of N-butyl taurine as the potassium salt dissolved in 425 grams of water. There was formed potassium coco acid N-butyl taurate as a slurry in 93.7% of the theoretical yield.

*Example VII*

Example I, portions A and B were repeated with the exception that the sodium salt of methyl taurine was replaced by an equivalent amount of the sodium salt of N-propyl taurine. There was formed sodium oleoyl tauride in a yield of about 98% as compared with 92% in portion B.

We claim:

1. The process of preparing N-acyl taurides which comprises condensing 1 mole of a metal salt of a tauride having the following general formula:

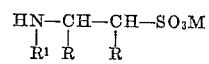

wherein R represents a member selected from the class consisting of hydrogen, methyl and ethyl groups, and $R^1$ represents a member selected from the class consisting of hydrogen and saturated hydrocarbon radical containing from 1 to 20 carbon atoms, and M represents a metal selected from the class consisting of alkali and alkaline earth metals, by the addition to the metal salt of said tauride, at a temperature ranging between 10° and 90° C., of about ½ mole of a monocarboxylic acid chloride of 6 to 22 carbon atoms to evolve HCl which combines with the excess tauride, after the pH is reduced to about 7 the formed tauride hydrochloride salt is neutralized with an alkali metal hydroxide so as to raise the pH above 7, adding about ¼ to ½ mole of said monocarboxylic acid chloride until the pH again drops to about 7, the additional tauride hydrochloride salt formed is again neutralized with an alkali metal hydroxide, the addition of the said monocarboxylic acid chloride followed by neutralization with alkali metal hydroxide being alternately continued until 1 mole of the said monocarboxylic acid chloride has been added to substantially convert the metal salt of said tauride to the corresponding N-acyl tauride.

2. The process according to claim 1 wherein the metal salt of the 2-aminoalkane sulfonic acid is sodium N-methyl taurate.

3. The process according to claim 1 wherein the metal salt of the 2-aminoalkane sulfonic acid is sodium N-cyclohexyl taurate.

4. The process according to claim 1 wherein the metal salt of the 2-aminoalkane sulfonic acid is sodium taurate.

5. The process according to claim 1 wherein the metal salt of the 2-aminoalkane sulfonic acid is the sodium N-butyl taurate.

6. The process according to claim 1 wherein the metal salt of the 2-aminoalkane sulfonic acid is the sodium N-propyl taurate.

No references cited.